United States Patent [19]

Farr

[11] 4,301,629
[45] Nov. 24, 1981

[54] HOLE SEALING WATER-TIGHT PLUG

[75] Inventor: Steve M. Farr, Bedford Heights, Ohio

[73] Assignee: James Cooksey, Tulsa, Okla.

[21] Appl. No.: 52,606

[22] Filed: Jun. 27, 1979

[51] Int. Cl.³ .................... E04B 1/00; E04G 21/00
[52] U.S. Cl. ............................ 52/99; 52/100;
   52/125; 52/302; 52/303; 52/309.4; 52/514;
   52/743; 217/109; 220/234
[58] Field of Search ............ 52/743, 302-304,
   52/514, 99, 100, 309.4, 125; 220/234; 215/358,
   359, 361; 217/108, 109; 114/227

[56] References Cited

U.S. PATENT DOCUMENTS

| | | | |
|---|---|---|---|
| 2,321,515 | 6/1943 | Rice | 220/233 X |
| 2,538,288 | 1/1951 | Whitsel | 220/233 |
| 2,664,809 | 1/1954 | Morell | 52/303 X |
| 2,764,929 | 10/1956 | Tegarty | |
| 2,822,108 | 2/1958 | Moeller | 220/238 |
| 3,057,285 | 10/1962 | Wheeler | |
| 3,123,939 | 3/1964 | Erickson | 52/99 |
| 3,233,502 | 2/1966 | Fernberg | |
| 3,300,798 | 1/1967 | York | 85/77 X |
| 3,399,798 | 9/1968 | Sentz | |
| 3,513,875 | 5/1970 | Nelson | 52/743 X |
| 3,586,202 | 6/1971 | Shores | 220/233 |
| 3,596,948 | 8/1971 | Spoehr | 85/74 X |
| 3,606,070 | 9/1971 | Shepherd | |
| 4,002,099 | 1/1977 | Bradley et al. | 85/74 |
| 4,116,106 | 9/1978 | Barbour | 52/514 X |
| 4,137,680 | 2/1979 | Doonan | 52/302 |

FOREIGN PATENT DOCUMENTS

| | | |
|---|---|---|
| 253982 | 8/1964 | Australia |
| 1078469 | 3/1960 | Fed. Rep. of Germany |

*Primary Examiner*—Alfred C. Perham
*Attorney, Agent, or Firm*—Stevens, Davis, Miller & Mosher

[57] ABSTRACT

Disclosed are several embodiments of a water-tight plug which are particularly suitable to close and seal holes drilled through the exterior wall surface of a house or mobile home during installation of insulation materials. The disclosed plugs include fluid-tight sealing means provided adjacent a head of the plug which is sandwiched during plug installation between a surface around the periphery of a hole and the plug head. In addition, the plugs include a projection from the plug head extending into the hole and a means for radially outwardly expanding at least a portion of the projection against the interior periphery of the hole and locking the projection in its radially expanded position to lock the plug in position.

38 Claims, 16 Drawing Figures

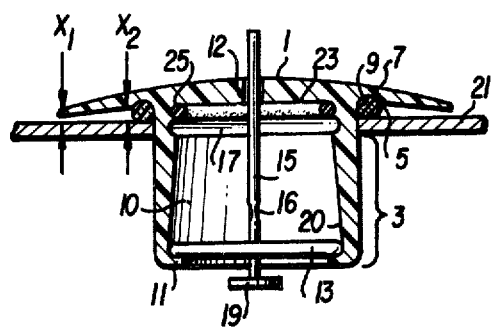
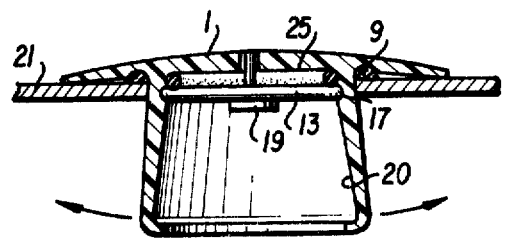
FIG. 1  FIG. 2
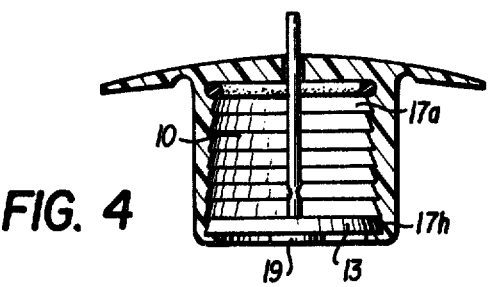
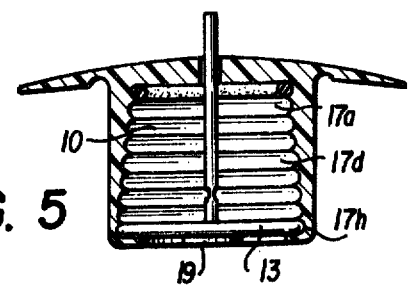
FIG. 4  FIG. 5
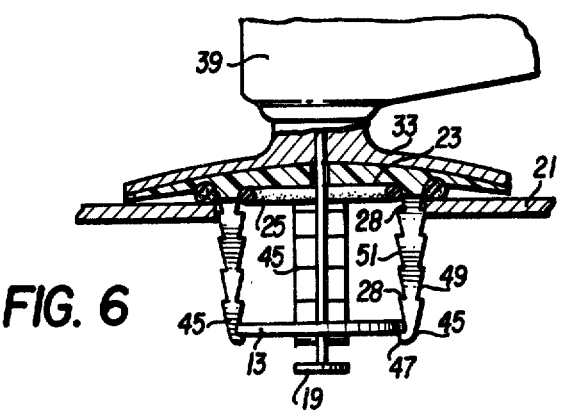
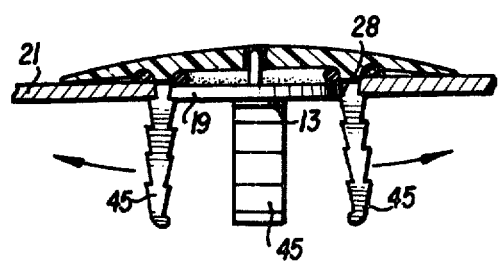
FIG. 7
FIG. 6
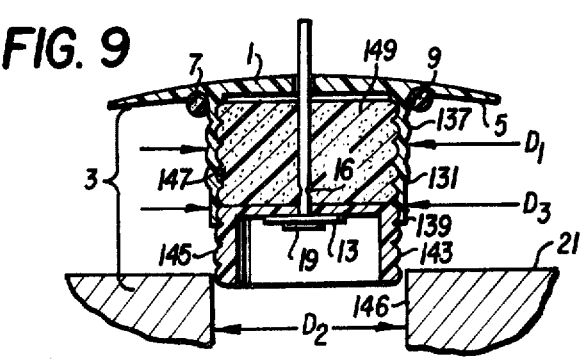
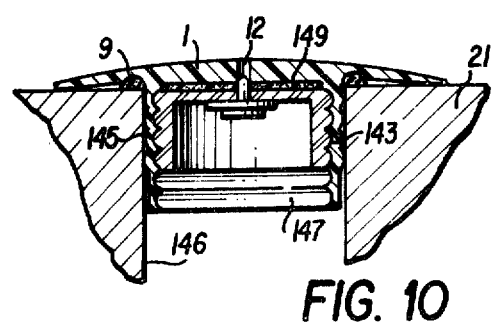
FIG. 9  FIG. 10

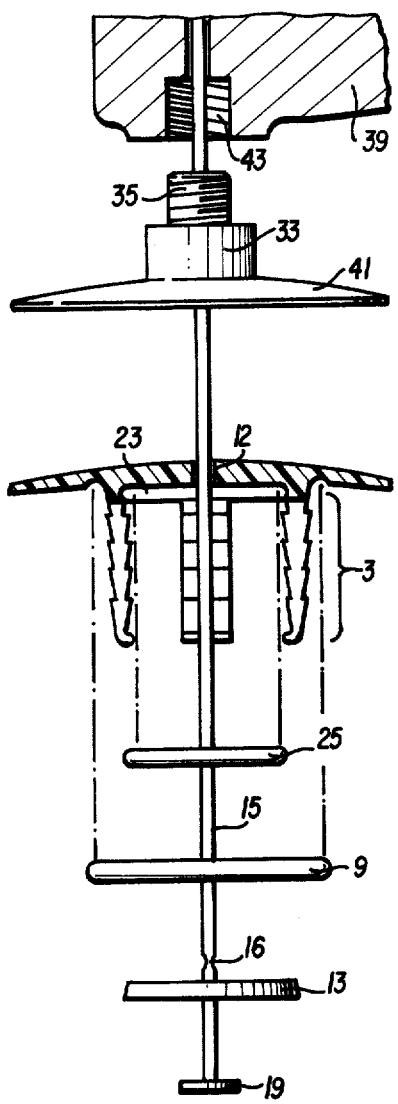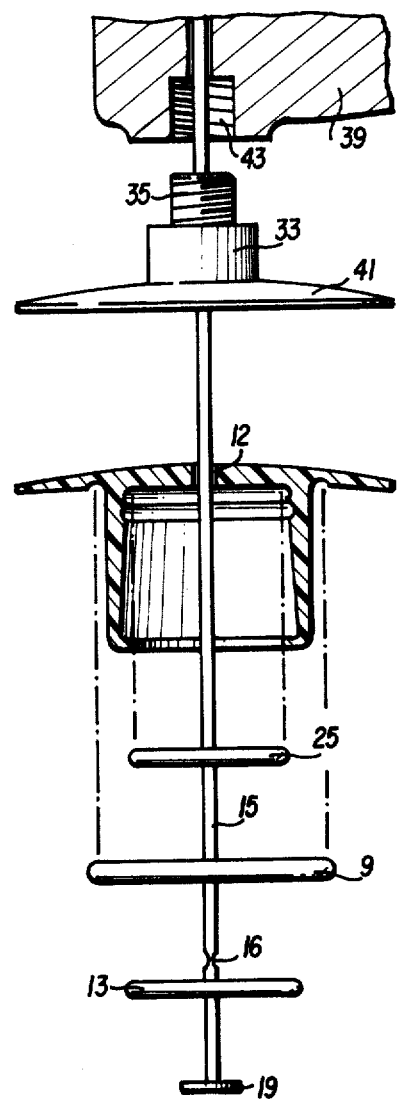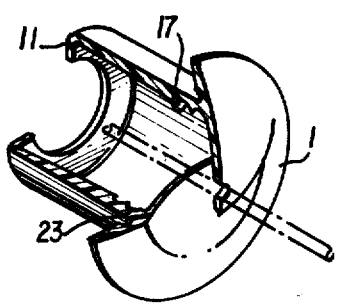

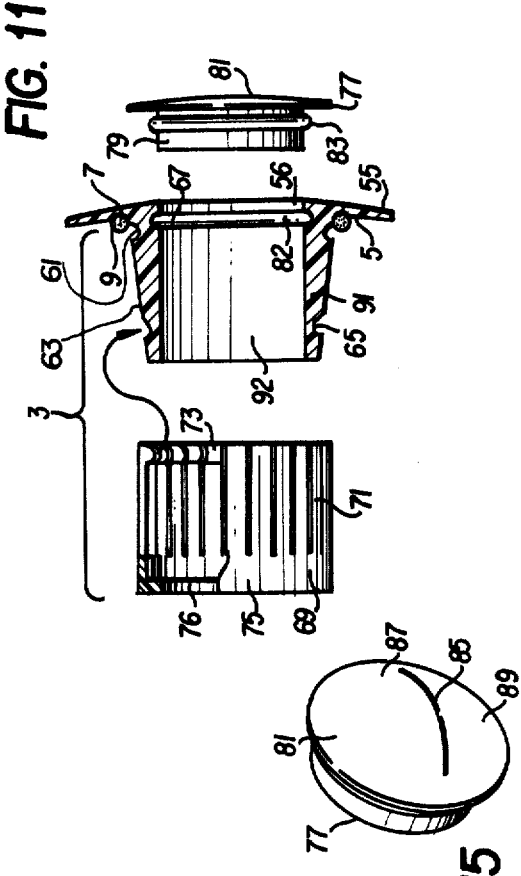
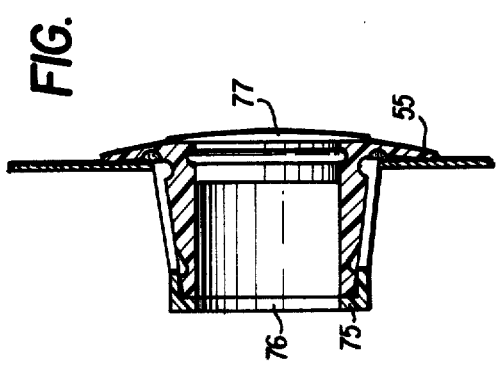
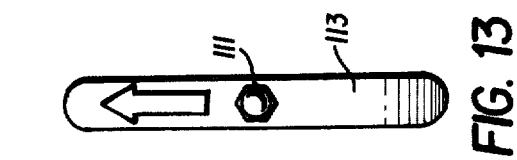
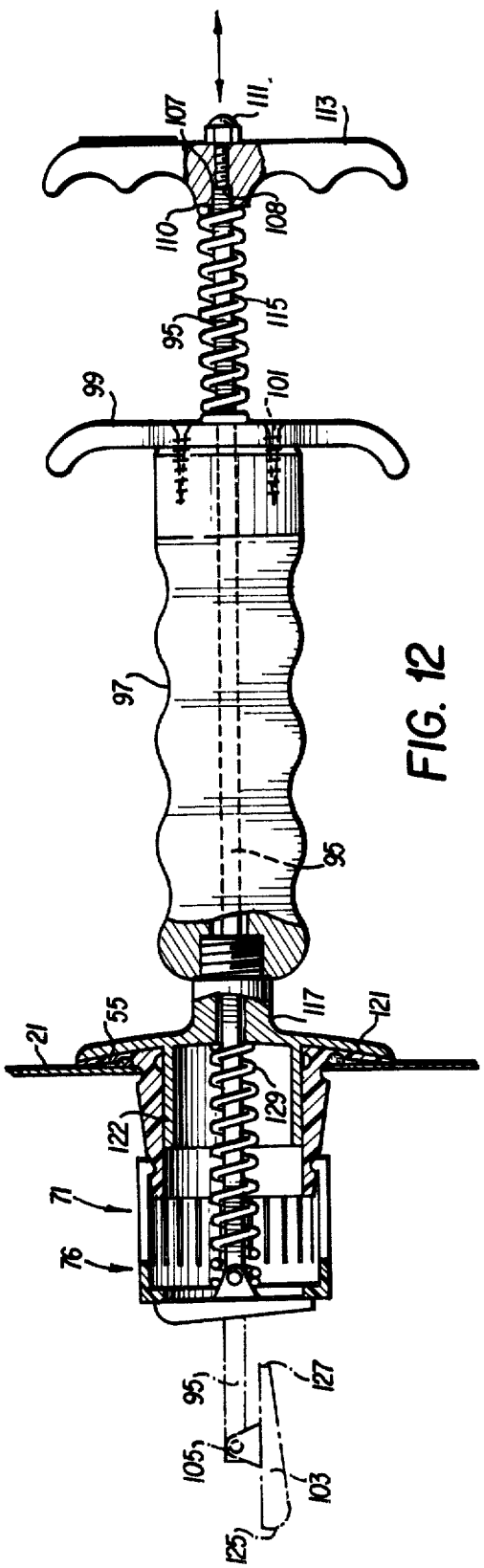

HOLE SEALING WATER-TIGHT PLUG

BACKGROUND OF THE INVENTION

The present invention relates generally to plugs for sealing holes, and, more particularly, to plugs for sealing holes drilled through the interior or exterior wall surface of a house or mobile home during, for example, the installation of insulation materials.

Over the past few years the technique of blowing in insulation through holes drilled in the walls of houses and mobile homes has become very popular as a convenient way to insulate an uninsulated structure or to add additional insulation. This technique requires the drilling of a series of holes in either an interior or exterior wall, blowing in insulation and then sealing the holes with a patch or plug after installation of the insulation. For the sake of simplicity and convenience, the holes are usually drilled in the exterior wall and plugs are used to close them. A serious problem occurs with sealing exterior wall holes with plugs as the plugs now used permit the entrance of water past the plug and into the insulated wall. As a result of the plug leaking, the installed insulation soon becomes wet, whereupon it loses its insulation value and, in cold weather, freezes thereby forming a block of ice-encased insulation between the interior and exterior walls of the insulated structure.

In addition to losing its insulation value, wet insulation, particularly cellulose, also loses much of its fire retardency capability, thus providing the potential for a serious tragedy should a fire occur. If foam insulation is used, the entering water can cause it to shrink and separate and create an unattractive chemical residue which can pass through the leaking plug and drip down an exterior wall. The entrance of water also causes a settling of the insulation leaving gaps of uninsulated areas in the wall and further results in the warping and rotting of the wood framing members used to construct the walls. Thus, over a period of years subsequent to an insulation job, major structural damage can result.

Conventional plugs are also retained in place by a simple force fit of a projecting portion of a plug into the hole often producing a loose fit which is insufficient to retain a plug in place, particularly after water seeps into the interior wall and the structural wall support members begin to warp and rot or wet insulation begins to dry out. In addition, the installed compacted insulation presses against the projecting portion of a plug further inhibiting long term retention of a plug in place. Conventional plugs are also designed to fit in a perfectly drilled hole; consequently, if the hole is not properly drilled, the plugs will not be reliably retained in place. Accordingly, after insulation conventional plugs often project away from a sealed exterior wall surface by a quarter of an inch or more and in some instances the plugs fall out. This further aggravates the problem of preventing ingress of water into the interior of an unsulated wall.

The fluid leakage problems are particularly acute in a mobile home having a flat roof and an exterior siding which consists solely of an aluminum sheet which runs from floor to ceiling. If the hole is drilled at a relatively high position on the exterior siding and water enters because of an insufficient sealing of the plug to the exterior surface, this water will run all the way down the interior side of the aluminum sheet wetting all adjacent insulation. If a hole is drilled in the roof and an installed plug leaks, the entering water can ruin an interior ceiling and roof support in addition to the installed insulation.

SUMMARY OF THE INVENTION

The present invention is designed to overcome the water leakage and retention in place problems associated with conventional plugs by providing an easily installed plug which forms a highly effective fluid-tight seal between it and an adjacent wall surface and which remains in place once installed. The plug includes a head portion, a projection connected to the head portion which fits into a hole, and means for radially outwardly expanding the plug projection and for locking it in its radially expanding condition to positively lock the plug in position. The fluid-tight sealing is accomplished by providing a gasket of suitable material, for example, a closed cell foam in a recess provided in the plug head which is sandwiched during plug installation between a surface containing a hole to be sealed and the plug head. The means for causing radial expansion of the plug projection may include a plate abutting a tapered interior periphery of the projection which causes radial expansion of the projection as the plate is drawn toward the plug head by the pulling of a rod connected to the plate, the rod passing through the plug head where it can engage with a drawing tool. After radial expansion of the projection, the plate is locked in position.

The rod may be pulled by a manipulation tool which can be an ordinary and readily procurable pop rivet tool. Thus no special tools are required to provide a highly effective sealing.

Alternatively, the means for causing radial expansion may include a sleeve portion of the projection surrounding a tapered outer periphery projection portion connected with the head portion, the sleeve being drawn along the tapered portion toward the plug head causing its radial expansion by a suitable specially designed tool inserted through a plug aperture.

In yet another arrangement, the means for causing radial expansion may be a plug insert having a rippled exterior which cooperates with a rippled interior of a flexible partially collapsible projection insertable in a hole and having an outer diameter greater than the diameter of a hole, the insert being drawn toward the plug head by a rod passing through the plug head by the above described pop rivet tool causing radial expansion of the partially collapsed projection.

All plug heads may be optionally provided with a line of material weakness which may be separated by a screwdriver or the like to provide a ventilation passage for the hole, if one is desired.

These and other objects and advantages of the invention will be more apparent from the following description of exemplary embodiments of the invention which are taken in conjunction with the drawings described as follows.

BRIEF DESCRIPTION OF THE DRAWINGS

FIG. 1 illustrates a sectional side view of a first embodiment of the plug constructed in accordance with the invention;

FIG. 2 illustrates a sectional side view of the FIG. 1 plug after installation in a hole;

FIG. 3 illustrates in greater detail the structures of FIG. 1 together with an associated installation tool;

FIG. 4 illustrates a sectional side view of a modification of the first embodiment;

FIG. 5 illustrates a sectional side view of another modification of the first embodiment;

FIG. 6 illustrates a sectional side view of a second embodiment of the plug together with an installation tool;

FIG. 7 illustrates a sectional side view of a second embodiment of the plug, after installation;

FIG. 8 illustrates in greater detail the structures of FIG. 6;

FIG. 9 illustrates a sectional side view of a third embodiment of the plug;

FIG. 10 illustrates a sectional side view of the third plug embodiment, after installation;

FIG. 11 illustrates a sectional side view of a fourth plug embodiment;

FIG. 12 illustrates a sectional side view of an insertion tool for use with the fourth plug embodiment;

FIG. 13 illustrates an end view of FIG. 12;

FIG. 14 illustrates a side sectional view of the fourth plug embodiment after installation;

FIG. 15 illustrates a perspective view of a head portion of the fourth plug embodiment having a line of material weakness therein; and FIG. 16 illustrates a perspective view of the first plug embodiment having a line of material weakness in a head portion.

DETAILED DESCRIPTION OF THE INVENTION

FIG. 1 shows a plug constructed in accordance with the first embodiment of the invention. The plug includes a head portion 1 and a projection 3 constructed as an annular extension of head 1. Preferably, the head 1 and projection 3 are integrally molded of a flexible plastic material such as a synthetic resin, for example, nylon. Nylon is particularly suitable as it resists yellowing caused by aging. Projection 3 has a substantially uniform outer diameter along its axial length, although a slight tapering outward of projection 3 from its end to the head 1 could also be employed.

An annular recess 7 is provided in an under surface 5 of the plug head, the surface 5 being adapted to engage with a wall surface 21 surrounding a hole. The recess 7 can be constructed as a well or depressed area, as illustrated in FIG. 1, or it may be formed by providing an angle of less than 90° at the point where surface 5 meets with the exterior peripheral wall of projection 3.

The recess is fitted with an annular sealing gasket 9 which may be made of rubber, resilient plastic, etc., but is preferably made of a closed cell foam, such as a cross-linked foamed polyethylene. The sealing gasket 9 projects out of recess 7 above the level of surface 5, as illustrated in FIG. 1.

The top of plug head 1 is formed in a dome shape which, along with under surface 5, tapers toward the edge of head 1. The peripheral annular area of the head 1 formed by surface 5 and the top of the dome bends slightly in the direction of projection 3 such that when the plug is partially inserted in a hole, as in FIG. 1, the distance $X_1$ between the outermost peripheral portion of surface 5 and surface 21 is less than the distance $X_2$ between an innermost peripheral portion of surface 5 and surface 21. With this construction, the outermost peripheral portion of surface 5 first engages with a wall surface 21 during plug installation.

The interior periphery 20 of projection 3 tapers to a narrower inside diameter from its end to head 1 and defines a cavity 10 housing cylindrical plate 13 disposed perpendicularly to the axis of head 1. Plate 13 is held in cavity 10 by an inwardly directed ridge 11 integrally provided at the outermost end of projection 3. In its rest position plate 13 is held adjacent ridges 11, as shown in FIG. 1.

An abutment 19 engages with plate 13 and is connected with a drawing device which may be a wire, cord, nylon line, cable, or the like, but in a preferred form is a rod 15 having a weakened portion 16. Abutment 19 may be dispensed with and the rod 15 directly connected to plate 13, if desired. Rod 15 projects through a central aperture 12 provided in head 1 and is engageable with a manipulation tool 39 (FIG. 3), described more fully below.

A plate locking recess 17 is provided on the interior wall 20 of projection 3 at a position substantially opposite to where the exterior periphery of projection 3 engages with the interior periphery of a hole in wall 21. The purpose of locking recess 17 is to hold the plate 13 in a desired locked position once it is drawn to and reaches recess 17. An annular sealing recess 23 is also provided adjacent locking recess 17. Sealing recess 23 is fitted with an annular or disc-shaped sealing gasket 25 which can be any of the materials described above for gasket 9 but which, again, is preferably constructed from a closed cell foam.

If the plug is to be used in an environment where only a very thin outer wall will be encountered, such as aluminum siding, only a single locking recess 17 is needed at an end portion of the projection 3 near the plug head, as illustrated in FIG. 1. However, if the plug is to be used with both thin and thick outer walls, a plurality of locking recesses 17a–17h are provided along the axial extent of the projection 3, as illustrated in FIG. 5.

The plug is designed for use with a drawing tool such as a conventional pop rivet tool 39 fitted with a dome-shaped head 33, (FIG. 3). Dome head 33 includes a portion 41 mating with the top surface of plug head 1 and a screw thread portion 35 which engages with screw threads 43 of rivet tool 39. A central through hole is provided in dome head 33 so that rod 15 may pass therethrough and be gripped by rivet tool 39. The dome head 33 is not absolutely necessary and can be dispensed with if desired; however, it does aid in the plug insertion operation by stabilizing the insertion operation, helping to align the rod 15 and tool 39, retaining a plug in place during drawing operation and preventing any marring, indentation or rupture of the plug head.

During use, the plug illustrated in FIG. 1 is inserted into a hole to be sealed. At first, the outermost edge of the surface 5 contacts with the wall surface 21. Slight pressure applied to the head of the plug causes slight outwardly directed radial expansion of the plug head 1, additional contact area between surface 5 and wall surface 21, and compression of the sealing gasket 9 between wall surface 21 and under surface 5, forming a water-tight seal between the plug and hole. While the plug is pressed against surface 21, rivet tool 39 is fitted over rod 15 and actuated to grasp and pull rod 15. Rivet gun 39 pulls rod 15 drawing abutment 19 (if used) and plate 13 toward head 1 until plate 13 reaches locking recess 17, whereupon further plate movement is arrested. Continued application of pulling force by rivet gun 39 after plate 13 is locked causes rod 15 to break at the weakened portion 16 with the rivet tool 39 withdrawing a broken portion of the rod through head 1. The position of weakened portion 16 is selected to coincide with the top surface of head 1 when plate 13 is in the locking recess 17 so that no hole is present in the top surface of the plug head 1 after the rod breaks.

During its axial movement towards head 1, plate 13 causes outward radial expansion of the outer periphery of projection 3 as it moves along a tapered interior periphery 20 of projection 3. Thus, as shown in FIG. 2, when plate 13 is in its final locked position, a radial expansion of projection 3 has occurred causing the locking of the plug in the hole to be sealed. Since the plug had a slight pressure applied to it to compress the sealing gasket 9, this position is maintained and the plug is now solidly fluid-tightly fixed in the hole.

If thicker exterior walls are encountered, the modified plug illustrated in FIG. 5 can be used. This plug includes, as noted previously, a plurality of annular locking recesses 17a–17h axially spaced on the tapered interior periphery 20 of annular projection 3. Depending on the thickness of wall encountered, at some point in the radial expansion of projection 3 sufficient resistance to further radial expansion and thus axial movement of plate 13 will be encountered causing rod 15 to break and plate 13 to be locked in one of the recesses.

The annular sealing gasket 25 which engages with a locked plate 13 in FIG. 2 fluid seals the interior of the hole from the ingress of water or moisture through the aperture 12 formed in head 1 through which rod 15 passes. Alternatively, a suitable sealing material may be provided in aperture 12 to surround rod 15. In the modified plug of FIG. 5, where the plate may not reach the last locking recess 17a, the sealing gasket 25 may be dispensed with in favor of a sealing material such as a foam which fills the entire cavity 10 of the projection 3, as in the subsequently described FIG. 9 embodiment.

The plug embodiments illustrated in FIGS. 1, 2 and 5 show locking recesses with curved profiles which mate with a curved edge portion of plate 13. As a modification to this arrangement, the plate can be constructed to have an angular tapered edge, as shown in FIG. 4. The angular tapered edge portion engages with one of a plurality of like profiled stepped annular locking recesses 17a–17h formed on the tapered interior of projection 3. Although a plurality of locking recesses 17a–17h are shown in FIG. 4, a single stepped recess may be provided adjacent gasket 25, as in the plug embodiment shown in FIGS. 1, 2 and 3. Moreover, like the FIG. 5 embodiment, the cavity 10 may be filled with a sealing material such as foam to prevent the entrance of water into the hole.

FIGS. 6, 7 and 8 illustrate the second embodiment of the invention in which the projection 3 is formed as a plurality of finger-like extensions 45 having saw-tooth shaped stepped surfaces 49 and 51 respectively provided on opposite exterior and interior sides. Although the sectional view in FIG. 6 is of a four finger-like extension plug, three or more such finger-like extensions can be used.

In FIGS. 6, 7 and 8, portions of the illustrated plug which correspond to like portions of the FIG. 1 plug are given the same reference numbers. As in the first embodiment, this second embodiment also includes a plate 13 engaging with an abutment 19 which is in turn connected to a pull rod 15. Again, rod 15 can also be directly connected to plate 13. The plate is retained on the interior side of all of the finger-like extensions 45 by a ridge 47 provided at the end of each. As can be seen, this embodiment contains the same annular recess 23 and associated sealing gasket 25 of the FIGS. 1–3 embodiment, as well as the same dome shape head 1, under surface 5, recess 7 and sealing gasket 9. The stepped interior sides 51 of finger-like extensions 45 taper towards the axis of head 1 in a manner similar to the tapered interior periphery 20 of projection 3 in FIGS. 1–3.

In use, the FIGS. 6–8 embodiment operates like that of FIGS. 1–3. The plug is first inserted into a hole to be sealed under the guidance of a dome shape head 33 provided on a conventional pop rivet tool 39. As the plug is pushed against the surface 21, the rivet gun 39 is actuated to draw pin 15, and thus abutment 19 and plate 13 towards the head 1. As plate 13 moves along the interior tapered stepped surface 51, it causes outward radial expansion of the finger-like extensions 45. The installed plug is illustrated in FIG. 7. A plurality of locking recesses 28 are provided by the stepped surface 51. Recess 23 holds the sealing gasket 25 which abuts plate 13 when the latter is locked in the last recess 28. A compressible sealing material such as a foam may be provided between the plate 13 and head portion 1 in lieu of the annular recess 23 and associated sealing gasket 25.

When the FIGS. 6–8 plug is used with a thin wall, plate 13 will be withdrawn along the entire axial extent of finger-like extensions 45 until it reaches the last locking recess. However, if a thicker wall is encountered, further radial expansion of finger-like extensions 45 will cease before plate 13 is withdrawn all the way to the last recess. As a result, rod 15 will break and plate 13 will lock in one of the recesses formed by the stepped areas of stepped surface 51. It will be appreciated that although plate 13 is shown having a rounded edge in this embodiment, it can also have the tapered angular edge shape illustrated in FIG. 4 to ensure better engagement with the stepped areas provided on the interior surface 51 of the finger-like extensions 45.

FIG. 9 illustrates a third embodiment of the invention which includes the same dome-shaped head portion 1, under surface 5, recess 7, and sealing gasket 9 used in the prior embodiments. In this embodiment, the projection 3 is formed as a two-piece construction. A first portion 131 is integrally molded with the head 1. This portion 131 is made of a relatively flexible plastic, for example, nylon and is formed of a first annular section 137 having a rippled outer peripheral shape and a greatest diameter $D_1$ and a second annular section 139 having a smooth periphery and an outer diameter $D_3$ smaller than the diameter $D_1$ of section 137. The first section 137 has an outside diameter which is larger than a hole diameter $D_2$ in which it is to be inserted while the second section 139 has a smaller diameter than the hole, as shown in FIG. 9. During plug insertion, section 139 first passes through the larger diameter hole and then resilient section 137 is radially compressed inwardly by a small amount so that it too fits within the hole.

The second part of the two-piece projection 3 includes an inner plug or insert 143 which is made of relatively hard incompressible plastic material. Inner plug 143 contains a rippled profile 145 on an outer peripheral portion which is complementary to a rippled profile 147 provided on the interior of extension 131. Inner plug 143 engages with plate 13 which in turn is moved by an abutment 19 and rod 15, as in prior embodiments. A compressible sealing material 149 fills the cavity formed by inner plug 143, projection 131, and plug head 1 which is preferably constructed as a closed cell foamed polyethylene as described above.

The plug shown in FIG. 9 is inserted into a hole generally illustrated by line 146. Because the largest outer diameter of the inner plug 143, as well as the outer diameter of portion 139, are smaller than the diameter of the hole, they are readily insertable therein. Moreover, although the largest outer diameter of rippled portion 137 is greater than the diameter of the hole, its resiliency permits a radial inward compression thereof so that it too is inserted within the hole. Thereafter, a pop rivet tool 39 is used to draw rod 15, and thus, inner plug 143 toward plug head 1, causing compression of the sealing material 149 and outward radial expansion of rippled portion 137 against the interior periphery of the hole. Eventually inner plug 143 reaches a position where further axial movement is prevented by its abutment with head 1, whereupon further drawing force on rod 15 causes it to break at line of weakness 16. FIG. 10 illustrates the installed plug. Compression of the sealing material 149 ensures sealing of the plug interior from the entrance of fluid through the head aperture 12 through which rod 15 passes.

An inner plug 143 has been shown which has a substantial inner cavity in order to save plastic; however, other constructions can be used, such as a plug which has a substantially filled or solid interior. In this case, plate 13 and abutment 19 would be mounted at the exterior side of inner plug 143 opposite the plug head 1, or plate 13 and abutment 19 could be molded within inner plug 143.

As evident from FIG. 9, any of the interior ripples 147 can serve to lock inner plug 143 against further axial movement depending on the thickness of the wall in which the illustrated plug is mounted. On thin walls such as aluminum siding, the inner plug 143 will always be drawn all the way up to the head 1 and locked; however, on thick walls which provide a considerable restriction against further axial movement of inner plug 143 as portion 137 radially expands, the inner plug 143 may lock at other positions where it is spaced from head 1.

All three just described embodiments employ the use of a break-away rod 15, such as used with conventional pop rivet tools for the sake of convenience. However, as described earlier, other drawing or pulling structures can also be used to pull plate 13, such as a nylon line, wire, cord, cable, etc., each of which can have a weakened portion to form a break-away drawing device. The only criteria being that the drawing structure be capable of withstanding the amount of force which is necessary to pull the plate axially along the projection 3, but which is capable of breaking upon the application of additional force once plate 13 is prevented from further axial movement. In lieu of the break-away feature, the drawing structure may merely be severed, such as by cutting, at the plug head upon conclusion of a drawing operation.

Thus far, all three described embodiments rely on a rod 15 or a like device to draw an interior plate 13 or inner plug 143 along the inner periphery of a plug protection 3 to a locked position causing outward radial expansion of the projection against a hole interior wall and the consequent locking of a plug in a hole to be sealed. The FIG. 11 embodiment accomplishes the same locking and sealing results, but using a different locking and expansion mechanism, as well as a special tool for mounting and locking the plug. This plug includes an annular head portion 55 defining a central aperture 56 and has an under surface portion 5 which is identical to the same surface as shown in the prior embodiments. An annular recess 7 is also provided in under surface 5 for holding the sealing gasket 9 as in the prior embodiments. In this embodiment, the projection 3 of the plug is formed as two pieces, a first annular piece 91 which is integrally molded with the annular head portion 55 and a second sleeve piece 69 which surrounds a portion of the axial extent of the first piece. The first piece 91 defines a cavity 92 and has an outer peripheral wall portion 63 tapered inwardly along the axial extent of piece 91 from annular head 55 to its end. Tapered wall portion 63 is provided to guide and force radially outwardly a portion of the sleeve piece 69 as described further below. The first piece 91 also includes a pair of annular recesses, a locking recess 61 and a restraining recess 65, provided on its external periphery respectively provided adjacent an end of the extension 91 and adjacent the annular head portion 55.

Sleeve 69 includes a base portion 75 having an aperture 76 therein and a plurality of circumferentially spaced fingers 71 projecting from base 75. Each of the fingers includes a ridge element 73 at its end. The plurality of ridges 73 engage with the annular recess 65 of the first piece 91 and hold the sleeve 69 thereto.

Sleeve 69 is attached to piece 91 by axially aligning it therewith and pushing the two pieces together until the ridges 73 lock into restraining recess 65. When the two pieces are fitted together, a substantial aperture exists through the axial extent of the two-piece assembly. An auxiliary plug 77 is provided for closing aperture 56 in annular head portion 55. Annular head portion 55 has an annular recess 67 on an interior periphery having a profile which is complementary to a profile 83 on the exterior periphery of a projection 79 of auxiliary plug 77. The auxiliary plug 77 further includes a dome shape head 81 which follows the domed profile of annular extension 55 when auxiliary plug 77 closes aperture 56. Profile 83 and complementary recess 67 are accurately machined to provide a fluid-tight sealing of the two when the auxiliary plug 77 is in place, and thus, no sealing material is needed.

In use, the two-piece (69, 91) assembly of FIG. 11 is first inserted onto a plug receiving end portion of the manipulation tool of FIG. 12, described in more detail below. Thereafter the plug is inserted into a hole and a counterweighted interconnected shoe 103 of the tool is manipulated to push sleeve 69 toward head portion 55 along the tapered outer periphery of piece 91. The force exerted by shoe 103 on sleeve 69 is sufficient to force ridges 73 of fingers 71 out of recess 65 and the sleeve 69 moves toward the annular head portion 55. As sleeve 69 moves it radially expands against the interior peripheral wall of the hole. Eventually, sleeve 69 is drawn to a position where ridges 73 engage with locking recess 61 where the expanded sleeve is held at a final locked position relative to the first piece 91. After installation of the two-piece assembly 91 and 69 and removal of the tool, insulation is blown through apertures 56 and 76. After installation of the insulation, auxiliary plug 77 is inserted into head portion 55, completing installation of the plug.

The tool of FIG. 12 which is used to install the two-piece assembly 91 and 69 can be inexpensively manufactured. It contains a central rod 95 having at one end thereof a pivot 105 to which is attached the counterweighted shoe 103. As illustrated, portion 125 of counterweighted shoe 103 contains more material than portion 127 located on the opposite side of the pivot axis. As a result, shoe 103 will assume a generally horizontal position in its rest state, as illustrated in FIG. 12 by the dotted line.

The tool further includes a grab handle portion 97 through which rod 95 passes which can be conveniently molded out of a plastic. A suitable complementary profile is provided for the exterior of rod 95 and the interior aperture of grab handle 97 to ensure that no relative rotation exists between these two elements. For example, rod 95 may be of a square or triangular configuration with a like configuration being provided for the through hole of grab handle 97. One end of the grab handle 97 is threaded with a dome-shaped plug insertion head 117 provided with an annular extension portion 122 extending from the underside of head 117. The underside 121 of dome head 117 is profiled to mate with the dome contour of annular head portion 55 of the plug illustrated in FIG. 11. The annular extension 122 has an outside diameter which is just slightly larger than the inside diameter of cavity 92, such that the two-piece plug assembly 91 and 69 can be easily force fit over annular extension 122 with annular head portion 55 abutting the underside 121 of dome head 117. Dome head 117 also includes an aperture through which rod 95 passes. A spring 129 or other suitable biasing means is provided between the underside 121 of dome head 117 and the end of rod 95 on which shoe 103 is pivotally mounted. The grab handle 97 is connected to a grab bar 99 by screws 101, adhesives or other fixing means, or by being molded integrally therewith.

Rod 95 projects through the end of grab handle 97 opposite the end containing the dome head 117 where it engages with a pull handle 113. A second spring 115 or other biasing means is provided between grab bar 99 and pull handle 113 to bias the two apart. The rod passes through a central aperture in pull handle 113 which includes a stepped portion 107. The rod 95 contains a like configured stepped portion 108 where its outer dimension is reduced from a square or triangular profile to a cylindrical screw thread 109. A nut or bolt 111 is threaded on screw thread 109 to hold handle 113 to the end of rod 95. The internal profile of the pull handle 113 aperture between an end face 110 and stepped portion 107 is complementary to the external profile of rod 95 (e.g., square or triangular shaped) to ensure no relative rotation of handle 113 about rod 95. Thus, pull handle 113 is also prevented from relative rotation with respect to handle 97 and grab bar 99. By mounting pull handle 113 non-rotatably about rod 95, one is assured that shoe 103 will be in the position illustrated in FIG. 12 when the pull handle is mounted in one of its two possible vertical positions. To ensure correct orientation of shoe 103 as shown in FIG. 12, pull handle 113 is also provided with an arrow (FIG. 13) or other indication showing proper orientation of the tool.

The use of the FIG. 12 tool to install the interconnected two-piece assembly 69, 91 of FIG. 11 in a drilled hole will now be described. First, pull handle 113 is vertically oriented with the arrow up and then pushed towards grab handle 97 to extend rod 95 to the dotted position illustrated in FIG. 12, where counterweighted shoe 103 assumes a generally horizontal position. This pushing is facilitated by an operator squeezing together pull handle 113 and grab bar 99. With shoe 103 in a generally horizontal position, the two-piece assembly (69, 91) can be inserted over it and onto annular extension 122 until the surface of annular head portion 55 abuts with the underside 121 of dome head 117. Thereafter, pull handle 113 is released and the shoe rotated, either automatically by the end of spring 129 abutting the pivot portion of shoe 103 or by a manual rotation of the shoe, so that it abuts with base portion 75 of sleeve 69, as illustrated by the solid line construction for the shoe 103 in FIG. 12. With the two-piece assembly 69, 91 and shoe 103 in the positions illustrated by solid lines in FIG. 12, the entire assembly is then inserted into a hole in the wall surface 21, whereupon the operator holds grab handle 97 stationary and pulls on pull handle 113, thereby drawing shoe 103 towards dome head 117. During this drawing operation, ridges 73 of sleeve 69 free themselves from recess 65 and sleeve 69 moves towards annular head portion 55. This operation continues until ridges 73 of sleeve 69 reach recess 61 of the piece 91 where they lock in position with the sleeve being radially expanded. Upon completion of this operation, pull handle 113 is again moved towards grab handle 97 causing rod 95 to move shoe 103 to a position where it disengages from the back side of sleeve 69 and falls under the weight of gravity, to again assume the dotted line position illustrated in FIG. 12. With the shoe in this position, the entire tool can now be withdrawn through the apertures 76 and 56.

After withdrawal of the tool, insulation materials are inserted into the wall in conventional fashion through the apertures of the installed two-piece assembly. After installation of insulation, auxiliary plug 77 is inserted into the annular head portion 55 to achieve a final sealing of the hole. FIG. 14 illustrates the completely installed plug.

Although all of the plugs of the invention are designed to achieve a fluid-tight sealing of a plug in a hole drilled into an exterior surface of a house or mobile home, it is sometimes desirable to provide a ventilation passage in the plug to allow the interior of the wall to breathe. To facilitate creation of a ventilation passage, the head portion 1 of the first three plug embodiments or the head of auxiliary plug 77 in the fourth plug embodiment can be modified to provide a portion of the head portion with a line of material weakness which can be ruptured, if desired, to permit the passage of air through the plug.

FIG. 15 illustrates the provision of a line of weakness in the dome head 81 of auxiliary plug 77 used with the FIG. 11 embodiment of the invention. The line of material weakness is formed by molding the head portion 81 such that it includes an area 85 where the plastic is thinner than over the remainder of head portion 81. With the thinner material, one can use a screwdriver or other tool to apply pressure to the head adjacent the line of weakness to cause a separation of portions of the head illustrated as 87 and 89 in FIG. 15 to provide a ventilating passageway. In order to inhibit the passage of water through this ventilating passageway, it is desired that the line of weakness be marked to ensure that the plug is installed with the line of weakness in a horizontal direction so that a bottom portion of the plug head below the line of weakness can be pressed in. In this way, any water dripping over the plug head will fall past the ventilation passage without entering the plug to any significant extent. Of course, if such a ventilation passage is desired in the embodiments of the plug illustrated in FIGS. 1–10, one would forego the interior sealing material (gasket 25 in FIGS. 1–8 and sealing material 149 in FIGS. 9 and 10). Also, suitable ventilating holes would be needed in plate 13 of FIGS. 1–5 or in the inner plug 143 of FIGS. 9 and 10. In the plugs shown in FIGS. 1–10, the line of material weakness would be provided at a portion of the plug head removed from aperture 12 passing the drawing device, e.g., rod 15, as illustrated in FIG. 16.

Although fluid-tight plugs for exterior walls have been described, the plugs can also be used on interior walls in which case the fluid sealing material described can be eliminated.

Although preferred embodiments of the invention have been described in some detail, it is to be understood that these embodiments are merely exemplary and that many modifications can be made therein without departing from the spirit and scope of the invention. Accordingly, the invention is limited solely by the following claims.

What is claimed is:

1. A plug for closing and sealing holes in a surface comprising:
   a head portion of predetermined outer dimensions having on one side thereof an outer surface adapted to abut a surface defining the periphery of a hole; and,
   a projection extending from said head portion at said one side for insertion into said hole, said projection including means for radially expanding at least a portion of said projection into engagement with the inside periphery of said hole to hold said plug in said hole, said projection comprising a resilient extension of said head portion on said one side, the interior wall of said extension tapering outwardly toward the interior periphery of a hole to be sealed along the axis of said extension from said head portion to the end of said extension, and said means for radially expanding said projection comprising a plate movable axially of and within said extension and disposed perpendicularly to said axis, said interior wall of said extension engaging with the outer edge of said plate, means for axially moving said plate from a rest position at the end of said extension toward said head portion along said interior wall causing expansion of an exterior peripheral wall of said extension, and at least one locking means spaced between the distal end of said extension and said head portion for retaining said plate in a predetermined locked position.

2. A plug as in claim 1 further comprising a ridge directed inwardly of said extension and provided at the distal end of said extension for retaining said plate in said extension.

3. A plug as in claim 2 wherein said extension is an annular extension.

4. A plug as in claim 3 wherein said locking means comprises a first annular recess provided in said interior wall of said extension which restrains said plate from axially moving away from said head when the plate is axially moved to said first annular recess.

5. A plug as in claim 4 wherein a plurality of spaced locking means are provided between said ridge and head, each said locking means comprising an annular recess in the interior wall of said extension.

6. A plug as in claim 4 further comprising a sealing material for engaging with a locked plate.

7. A plug as in claim 6 wherein said annular extension further comprises a second annular recess provided in the interior wall of said extension adjacent said first annular recess between said first annular recess and said head portion, and wherein said sealing material is provided in said second annular recess for engaging with a locked plate.

8. A plug as in claims 4 or 5 wherein said plate includes a tapered peripheral edge and each said locking means comprises a stepped recess profiled to engage with said tapered peripheral edge.

9. A plug as in claims 4 or 5 wherein said plate includes a rounded peripheral edge and each said locking means comprises a rounded recess profiled to engage with said rounded peripheral edge.

10. A plug as in claim 1 wherein said projection comprises a plurality of finger-like extensions extending from said one side of said head and spaced equally about an imaginary circle which is coaxial with said head, each of said fingerlike extensions having respective interior surfaces which taper radially outward of the axis of said head portion from said head portion to the end of said extensions, each of said extensions also having an outer outwardly directed surface.

11. A plug as in claim 10 wherein said finger-like extensions each have a ridge directed toward the axis of said head portion, and wherein said means for radially expanding said projection comprises a plate disposed perpendicularly to the axis of said head portion and adapted for movement along said axis, said plate being bounded by said finger-like extensions and having an outer edge for engaging with the interior surfaces of said finger-like extensions and being restrained within said finger-like extensions by said ridges, said plate being engageable with said tapered interior surfaces and axially movable along said axis toward said head portion to force said finger-like extensions radially outward to press against the walls of a hole, means for moving said plate along said axis toward said head portion, and, at least one locking means spaced between said ridges and head portion for retaining said plate in a predetermined locked position.

12. A plug as in claim 1 wherein said means for moving said plate is a pulling device engageable therewith which passes through said head portion.

13. A plug as in claim 12 wherein said means for moving said plate is a rod normal to said plate, said rod passing through and extending from said head portion.

14. A plug as in claim 12 wherein said pulling device is a nylon line which extends through said head portion.

15. A plug as in claim 12 wherein said pulling device is a wire which extends through said head portion.

16. A plug as in claim 12 wherein said pulling device is a cable which extends through said head portion.

17. A plug as in claim 12 wherein said pulling device is a cord which extends through said head portion.

18. A plug as in claim 1 wherein a plurality of locking means are provided spaced along the length of said extension.

19. A plug as in claim 11 wherein each said locking means comprises a stepped area provided at the same corresponding position in each finger-like extension, each said locking means preventing said plate from axially moving away from said head portion.

20. A plug as in claim 11 further comprising a sealing material for engaging with a locked plate.

21. A plug for closing and sealing holes in a surface comprising:
   a head portion of predetermined outer dimensions having on one side thereof an outer surface adaped to abut a surface defining the periphery of a hole; and, a projection extending from said head portion at said one side for insertion into said hole, said projection including means for radially expanding at least a portion of said projection into engagement with the inside periphery of said hole to hold said plug in said hole, said projection being a flexible annular extension extending from said one side of said head portion and having at its outer periphery a first annular rippled portion of a first outer diameter taken at the peak of a ripple, said first annular rippled portion being adjacent said head portion, and a second annular portion of a second outer diameter which is less than said first outer diameter adjacent said first annular rippled portion, said flexible annular extension having on its inner wall an annularly rippled profile extending over at least a portion of its length, said plug further comprising a relatively inflexible insert having an annularly rippled profile complementary to the inner wall of said extension which is engageable therewith and which is movable toward said head portion, and means for moving said insert toward said head portion.

22. A plug as in claim 21 wherein said first outer diameter is greater than and said second outer diameter is less than the diameter of a hole sealed by said plug.

23. A plug as in claim 22 wherein said means for moving comprises a plate for moving said insert which engages with a pulling device which passes through said head portion.

24. A plug as in claim 23 further comprising a resilient sealing material filling the interior of said flexible annular extension between said insert and said head portion.

25. A plug as in claim 24 wherein said sealing material is a closed cell foam material.

26. A plug as in claim 23 wherein said pulling device is a wire which is connected with said plate and extends through said head portion.

27. A plug as in claim 23 wherein said pulling device is a cable which is connected with said plate and extends through said head portion.

28. A plug as in claim 23 wherein said pulling device is a cord which is connected with said plate and extends through said head portion.

29. A plug as in claim 23 wherein said pulling device is a nylon line which is connected with said plate and extends through said head portion.

30. A plug as in claim 23 wherein said pulling device is a rod which is connected with said plate and extends through said head portion.

31. A plug as in claim 1 or 21 wherein said outer surface has a peripheral recess therein and further comprising a resilient gasket mounted in said recess and extending outwardly thereof, so as to be compressed between said hole peripheral surface and said head portion outer surface upon plug installation.

32. A plug as in claim 31 wherein said head portion has a substantially circular shape and said recess and gasket have an annular shape.

33. A plug as in claim 1 or 21 wherein said head portion is made of plastic and is provided with a line of material weakness which can be selectively broken by the application of pressure for providing a ventilating air passage.

34. A plug as in claim 1 or 21 wherein said head portion, and at least a portion of said projection are molded from plastic as a unitary assembly.

35. A plug as in claim 31 wherein said head portion is dome shaped and the surfaces on both sides of said head portion taper to define a head portion edge, said outer surface being one of said sides and bending toward said projection at said edge, such that the initial point of contact of said head portion with said surface defining the periphery of said hole is at said edge.

36. A plug as in claim 35 wherein said recess is formed by an angle of inclination between said outer surface and said projection of less than 90°.

37. A plug as in claim 35 wherein said recess is formed as an annular depression in said outer surface at a position adjacent said projection.

38. A plug as in claim 31 wherein said gasket is formed of a closed cell foam material.

* * * * *